United States Patent [19]

Pyrih et al.

[11] 4,305,912

[45] * Dec. 15, 1981

[54] PROCESS FOR RECOVERING URANIUM FROM WET PROCESS PHOSPHORIC ACID (III)

[75] Inventors: Roman A. Pyrih; Robert S. Rickard, both of Golden; Orin F. Carrington, Arvada, all of Colo.

[73] Assignee: Earth Sciences, Inc., Golden, Colo.

[*] Notice: The portion of the term of this patent subsequent to Mar. 24, 1998, has been disclaimed.

[21] Appl. No.: 927,391

[22] Filed: Jul. 24, 1978

[51] Int. Cl.³ .................... B01D 11/04; C01G 43/00; C22B 60/02
[52] U.S. Cl. .......................................... 423/10; 423/7
[58] Field of Search ................................ 423/7, 8, 10; 252/301.1 W

[56] References Cited

U.S. PATENT DOCUMENTS

| | | | |
|---|---|---|---|
| 2,812,233 | 11/1957 | Lewis, Jr. et al. | 423/10 |
| 3,102,782 | 9/1963 | Small | 423/7 |
| 3,203,968 | 8/1965 | Sebba | 423/7 X |
| 3,791,981 | 2/1974 | Calmon | 252/301.1 W |
| 3,835,214 | 9/1974 | Hurst et al. | 423/10 |
| 3,880,980 | 4/1975 | Wamser | 423/7 |

*Primary Examiner*—Richard D. Lovering
*Attorney, Agent, or Firm*—Sheridan, Ross & McIntosh

[57] ABSTRACT

Organic substances are removed from a highly ionic medium by contacting the medium with a substantially hydrophobic polystyrene type resin. This process is especially useful in the hydrometallurgical processes for the removal of organic substances from highly ionic raffinates prior to the recycle of the raffinate into the hydrometallurgical process.

8 Claims, No Drawings

4,305,912

PROCESS FOR RECOVERING URANIUM FROM WET PROCESS PHOSPHORIC ACID (III)

BACKGROUND OF THE INVENTION

Liquid-liquid solvent extraction is used in hydrometallurgical processes for the recovery and refining of valuable minerals, for example, rare earth and precious metals, copper, vanadium, nickel, cobalt and the extraction of uranium from wet process phosphoric acid. In most of these liquid-liquid solvent extraction processes, a highly ionic aqueous solution, which is highly acidic or basic and carries valuable metals, is contacted with an organic solution containing a liquid-liquid solvent extraction agent dissolved in a suitable inert diluent such as kerosene. Contact between the two liquid phases effects a metal transfer from the highly ionic aqueous phase into the immiscible organic phase and results in a raffinate essentially barren of the valuable metal. However, this raffinate does contain entrained and dissolved liquid-liquid solvent extraction agents and inert organic diluents as a result of the liquid-liquid solvent extraction process. This results in a significant loss of from a few parts per million to several hundred parts per million of the solvent extraction agent and diluent. Such a loss occurs at a significant cost to the operation of a hydrometallurgical process. Further, because the raffinate is often recycled back into the process, the presence of solvent extraction agent and organic diluent (also referred to as uranium process organics) in the highly ionic aqueous raffinate is sometimes incompatible with ensuing operations. For example, the contaminated ionic aqueous raffinate may adversely affect further chemical processing of the raffinate or it can be detrimental to plant equipment by causing a deterioration of rubber elements in the equipment.

The prior art has taught the use of the polymers of the present disclosure for the removal or concentration of organic substances. U.S. Pat. No. 2,974,178 to Hwa, et al teaches the use of a polyethylenically unsaturated polymer containing vinyl or vinylidene groups to concentrate a component of a homogeneous liquid mixture of non-ionogenic character. U.S. Pat. No. 3,531,463 to Gustafson teaches the use of similar polymers for separating water-soluble substances having hydrophobic and hydrophilic portions in their molecules from an aqueous medium. Neither one of these patents recognizes the use of such polymers for the recovery of organic substances from highly ionic hydrometallurgical raffinates. Hwa, et al specifically teaches against the use of such a polymer in an ionic solvent.

SUMMARY OF THE INVENTION

This invention entails a process for the separation of organic substances from a highly ionic medium by contacting the medium with a substantially hydrophobic polystyrene type resin. The organic substances are absorbed or adsorbed onto the resin and subsequently recovered by elution of the organic substances from the resin with the use of an appropriate desorbent. Alternatively, the highly ionic aqueous solution can be treated with conventional flotation methods to remove entrained organic substances and, thereafter, treated with the polystyrene type resin to remove the remaining dissolved organic substances.

This process is especially applicable to raffinates which are produced and recycled in a hydrometallurgical process. Such a raffinate is a product of a liquid-liquid solvent extraction an ion exchange step; it is generally a highly acidic or alkaline aqueous solution and contains entrained and dissolved solvent extraction agent and organic diluent. More particularly, this process is useful for the removal of uranium process organics from the raffinate produced in the recovery of uranium from wet process phosphoric acid. It is done prior to the recycling of the raffinate to the wet process plant. The recovered process organics can then be recycled to the first liquid-liquid solvent extraction circuit.

DESCRIPTION OF THE PREFERRED EMBODIMENTS

The present invention is a process for the separation of an organic compound contained within a highly ionic solution. This type of mixture is commonly found as a product of hydrometallurgical processes which utilize a liquid-liquid solvent extraction agent to extract uranium, copper, vanadium, cobalt, nickel or other valuable elements.

The present invention is especially useful as an adjunct in processes for the recovery of uranium from wet process phosphoric acid like that disclosed in U.S. Pat. No. 3,835,214 and our co-pending patent applications: Ser. No. 833,247 filed Sept. 14, 1977, now U.S. Pat. No. 4,258,013; Ser. No. 845,351 filed Oct. 25, 1977, now U.S. Pat. No. 4,258,014; and Ser. No. 845,352 filed Oct. 25, 1977, now U.S. Pat. No. 4,258,015. In these processes uranium is recovered from a phosphoric acid solution resulting from the treatment in the wet process plant of phosphate rock with sulfuric acid. In the first liquid-liquid solvent extraction circuit of the process, the uranium in the phosphoric acid solution is reduced to the uranous form and recovered from the phosphoric acid solution with a liquid-liquid solvent extraction agent, conventionally, a mixture of mono and di substituted phenyl esters of orthophosphoric acid (OPPA) dissolved in an inert organic diluent. The uranium is recovered from this loaded agent and subsequently processed through another liquid-liquid solvent extraction step to produce a uranium oxide product. This phosphoric acid raffinate from the primary solvent extraction circuit contains some of the solvent extraction agent and organic diluent or uranium process organics. This raffinate is contacted with a substantially hydrophobic, polystyrene type resin causing an adsorption or absorption separation of these uranium process organics from the highly acidic, highly ionic raffinate. The uranium process organics are thereafter desorbed from the resin. This allows for the recycling of a process organic-free raffinate back into the wet process phosphoric acid plant, and the recycling of the solvent extraction agent and organic diluent back into the uranium circuit; thereby preventing deterioration of the rubber linings found in the phosphoric acid plant equipment and saving cost due to what would otherwise be the loss of the organic solvent extraction agent and diluent in the uranium recovery plant.

The resin employed in this process is a water-insoluble, cross-linked polymer consisting of a polyvinylbenzene. A polystyrene type is generally preferred and in particular Amberlite XAD-4 is preferred. Amberlite XAD-4 is an experimental polymeric adsorbent developed by Rohm and Haas and is described in U.S. Pat. No. 3,531,463 and a technical bulletin by the Fluid Process Chemicals Department of Rohm and Haas. It is a completely nonionic hydrophobic polymer, deriving its absorptive properties, in part, from its high surface area, macroreticular structure and aromatic nature of its surface.

The resin is employed in an amount sufficient to ensure the adsorption of all the uranium process organics present in the raffinate. It is preferred that an amount in excess of this amount be used.

The resin employed in this process acts mainly by adsorbing the uranium process organics; however some of the ability of the resin to remove these organic compounds may be due to absorption. To the extent the resin may be absorbing organic compounds, it is to be understood that such absorption is included in references made to the resin's adsorption of organic compounds.

The medium from which the uranium process organics are being recovered is a highly ionic aqueous solution. Generally, it is a highly ionic aqueous solution of a strong acid or a strong base. More particularly, it is a solution of a mineral acid, examples of such acids include the phosphoric acids, sulfuric acid, nitric acid and hydrochloric acid; or a solution of a base, including alkali and alkaline earth hydroxides, carbonates and bicarbonates.

Any uranium process organic compounds which are generally found in the raffinate of a solvent extraction step of a hydrometallurgical process can be removed. Examples of such compounds include a wide variety of organo-phosphorus compounds which are known to be satisfactory for extracting uranium, vanadium, copper or other metals; for example, mono and di substituted phenyl esters of orthophosphoric acid, mono and di (octyl phenyl) esters of orthophosphoric acids. Additionally, a wide variety of satisfactory inert aliphatic or aromatic organic diluents, e.g., kerosene, aliphatic Amsco 450 and Amsco 460 (described in Example 1) will also be removed. After the removal of the uranium process organics from the ionic aqueous solution has been effected, they can be removed from the polymer resin by any conventional means. The adsorbed or absorbed organic compounds can be removed by heating to distill, treatment with steam to effect steam distillation, by extraction (leaching) or desorption with an organic solvent which is easily separated from the adsorbed liquid by some conventional procedures such as fractional distillation, or crystallization of one or the other liquid. Examples of organic solvents include acetone, methanol or ethanol.

The adsorption process of the present invention can be done as a batch-wise or continuous process. Additionally, the ionic aqueous solution may be passed in succession through a plurality of fixed beds of the adsorbent resin or through a plurality of adsorbent beds which are moved step-wise or continuously in countercurrent relation to the ionic aqueous medium.

Alternatively, the raffinate containing the entrained and dissolved uranium process organics can first be subjected to conventional flotation techniques to remove some of the entrained organic substances and, thereafter, contacted with the resin to remove any remaining entrained and dissolved uranium process organics. This results in the removal of essentially all uranium process organic substances from the raffinate.

The invention is illustrated by the following examples: These examples are meant to be illustrative of the invention but not limiting thereof.

EXAMPLE 1

The surface tension of varying strengths of reagent grade phosphoric acid and sulfuric acid solutions were measured. Thereafter, 100 milliliter samples of these acids were contacted with 10 milliliters of Union Amsco 460 solvent and 100 milliliters of a four molar sulfuric acid was contacted with 10 milliliters of Exxon Norpar 12. The organics and acids were mixed to form a 0.1 organic to acid ratio. Both Amsco 460 and Norpar 12 consist of miscible mixtures of normal paraffins, cycloparaffins and monoaromatics, along with a small percentage of diaromatics.

The organic bearing mineral acid solutions containing both entrained and dissolved process organics were passed through a column packed with 10 milliliters of Amberlite XAD-4 resin. The solution flow rate through the column was maintained at 7 bed volumes per minute. Samples of the column effluent were withdrawn and the surface tension of the treated mineral acid solutions remeasured. The results are presented in Table 1.

Surface tension was measured because it was found to be a sensitive indicator of the quantity of organics that became entrained and dissolved in the mineral acid as a result of contact with said acid.

TABLE 1

| | | Surface Tension, Dynes/cm | | |
|---|---|---|---|---|
| Aqueous | Organic | Before Organic Contact | Column Feed | Column Effluent |
| 0.5M $H_3PO_4$ | AMSCO 460 | 73.9 | 50.5 | 73.6 |
| 5M $H_3PO_4$ | AMSCO 460 | 76.5 | 56.9 | 77.7 |
| 10M $H_3PO_4$ | AMSCO 460 | 80.1 | 62.9 | 80.7 |
| 2M $H_2SO_4$ | AMSCO 460 | 75.4 | 72.5 | 75.0 |
| 4M $H_2SO_4$ | AMSCO 460 | 77.9 | 54.7 | 77.7 |
| 4M $H_2SO_4$ | NORPAR 12 | 77.9 | 74.9 | 76.6 |

EXAMPLE 2

Aliquots of mineral acids were contacted with Union Amsco 460 solvent to obtain an organic to acid ratio of 0.1. The aqueous and organic phases were permitted to thoroughly separate. The aqueous phase containing only dissolved organics was assayed for total organic carbon and then treated with 10 milliliters Amberlite XAD-4 resin. The results are shown below in Table 2.

TABLE 2

| | | Total Organic Carbon, ppm | | |
|---|---|---|---|---|
| Aqueous | Organic | Before Organic Contact | Column Feed | Column Effluent |
| 0.5M $H_3PO_4$ | AMSCO 460 | 0 | 11 | 2 |
| 5M $H_3PO_4$ | AMSCO 460 | 0 | 4 | 1 |
| 10M $H_3PO_4$ | AMSCO 460 | 0 | 9 | 5 |
| 2M $H_2SO_4$ | AMSCO 460 | 0 | 22 | 3 |

EXAMPLE 3

The process of the present invention was applied to the raffinate obtained from the first ion exchange step in the recovery of uranium from a wet-process phosphoric acid. A typical feed solution received from a wet-process plant is as follows:

| | |
|---|---|
| $U_3O_8$, grams per liter | 0.140 |
| emf. mv: | −260 |

-continued

| | |
|---|---|
| Total Fe, grams per liter | 4.1 |
| $Fe^{+2}$, grams per liter | 0.47 |
| $H_3PO_4$, %: | 39.1 |
| Specific Gravity: | 1.3085 |

The extraction of uranium with octylphenyl phosphoric acid (OPPA) in the first ion exchange step followed the procedure used in U.S. Pat. No. 3,835,214. The feed was preconditioned to an emf of −210 mv with iron to reduce the uranium to the uranous form and contacted with a 0.32 molar mixture of mono and di substituted phenyl esters of orthophosphoric acid dissolved in kerosene. Four counter-current extraction stages were used. Greater than 90 percent $U_3O_8$ extraction was consistently obtained. The following table presents extraction results based on actual circuit operation.

TABLE 3

EXTRACTION CIRCUIT
(After 225 Hours of Operation)

| Cell No. | $U_3O_8$, grams per liter | | $U_3O_8$ Extraction % |
|---|---|---|---|
| | Aqueous | Organic | |
| E-1 | 0.047 | 0.80 | 63.9 |
| E-2 | 0.024 | 0.29 | 81.5 |
| E-3 | 0.009 | 0.15 | 93.5 |
| E-4 | 0.009 | 0.15 | 93.5 |
| Feed | 0.130 | — | — |

A method of analysis for organics in the raffinate was developed in which the absolute organic concentration in the raffinate samples was determined by total organic carbon assays. The presence of uranium process organics was monitored by surface tension measurements and verified by infrared spectroscopy. Multiple independent analytical techniques demonstrated the effectiveness of the organic removal and recovery process.

It was found that about 9.76 pounds of uranium process organics were lost in every 1000 gallons of raffinate from the OPPA solvent extraction step and that the uranium process organics were substantially removed by combining a conventional flotation method with resin adsorption. Using this procedure all the organics introduced in the uranium recovery plant were removed from the phosphoric acid raffinate prior to its return to the wet-process plant.

The flotation tests were conducted in a conventional flotation cell. Experiments suggested that a flotation time of about twenty minutes was needed to remove most of the entrained uranium process organics from the raw raffinate. Total organic carbon assays and surface tension measurements showed that an additional secondary treatment with a polymeric resin was necessary to further reduce the level of dissolved uranium process organics remaining in the flotation underflow.

The adsorbent used was Amberlite XAD-4 resin. To test the adsorbent's ability to remove dissolved and entrained uranium process organics from the raffinate, a column was assembled and packed with 25 milliliters of hydrated Amberlite XAD-4 resin. After peconditioning the polystyrene resin beads with methanol and back washing and classifying with demineralized water, the adsorption cycle was started. Flotation underflow from the conventional flotation step was utilized as the column feed. The adsorption cycle was conducted at a down flow rate of about 7 bed volumes per hour. The first adsorption cycle was taken to near the saturation of the resin by uranium process organics. About 1217 bed volumes of raffinate were passed through the column in the first adsorption cycle.

The uranium process organics were eluted off the resin beads with about 3-5 bed volumes of methanol. The methanol was eluted with demineralized water and the resin beads reclassified for the next adsorption cycle. Six additional adsorption-elution cycles were run on the same resin sample. About 4,956 bed volumes of raffinate were treated in total during these cycles. No loss in capacity to adsorb uranium process organics from raffinate was observed.

The uranium process organics eluted from the resin beads with methanol were recovered by distilling off the methanol solvent. The recovered organics were recycled to the OPPA uranium extraction circuit.

Results of a typical run using the above-described procedure, flotation and polystyrene resin treatment, for removal of uranium process organics are presented in the following table.

TABLE 4

| Sample Material | Total Organic Carbon (ppm) | Surface Tension (dynes/cm) |
|---|---|---|
| Uranium Circuit Feed Acid (39% $H_3PO_4$) | 19-50 | 78.8-79.2 |
| Untreated Raffinate | 122-154 | 35.6-36.3 |
| Raffinate After Flotation Treatment | 88-102 | 58.9-65.5 |
| Raffinate After Polystyrene Resin Treatment (at 400 bed volumes) | 46-54 | 79.6-81.0 |

What is claimed is:

1. In the process for the recovery of uranium from a wet process phosphoric acid solution derived from the acidification of uraniferous phosphate ores in which the raffinate after removal of uranium from the phosphoric acid solution is recycled to the wet process plant, the process including the steps of reducing the uranium in the phosphoric acid solution to the uranous form and contacting the resulting solution with a liquid-liquid solvent extraction agent for uranous ions dissolved in an inert organic diluent to recover uranous ions with the agent, the improvement comprising the separation of the uranium process organics comprising the solvent extraction agent and the organic diluent from the highly ionic raffinate before it is recycled to the wet process by the following steps:
   (a) removing a portion of the uranium process organics from the raffinate by air flotation, and
   (b) removing the remainder of the uranium process organics from the raffinate by adsorption on beads of a substantially hydrophobic polystyrene type resin 2. The process of claim 1 in which the liquid-liquid solvent extraction agent consists essentially of a mixture of mono and di substituted phenyl esters of orthophosphoric acid.

3. The process of claim 1 wherein the process organics are removed from the substantially hydrophobic polystyrene type resin by elution with an organic solvent.

4. The process of claim 3 wherein the organic solvent used to elute the process organics from the polystyrene type beads is methanol.

5. The process of claim 4 wherein the process organics are recovered from the methanol by distilling off the methanol.

6. The process of claim 1 wherein the highly ionic raffinate is an aqueous solution of a mineral acid.

7. The process of claim 6 wherein the mineral acid is selected from the group consisting of phosphoric acids, sulfuric acid, nitric acid and hydrochloric acid.

8. The process of claim 1 wherein the adsorbent resin is Amberlite XAD-4.

* * * * *